United States Patent
Ueta et al.

(10) Patent No.: US 8,687,334 B2
(45) Date of Patent: Apr. 1, 2014

(54) POWER FEEDING CIRCUIT

(75) Inventors: Keisuke Ueta, Susono (JP); Akinori Maruyama, Susono (JP); Yoshihide Nakamura, Susono (JP); Yoshinori Ikuta, Susono (JP); Hideo Suganuma, Okazaki (JP)

(73) Assignee: Yazaki Corporation, Tokyo (JP)

( * ) Notice: Subject to any disclaimer, the term of this patent is extended or adjusted under 35 U.S.C. 154(b) by 407 days.

(21) Appl. No.: 13/049,565

(22) Filed: Mar. 16, 2011

(65) Prior Publication Data
US 2011/0228429 A1  Sep. 22, 2011

(30) Foreign Application Priority Data
Mar. 17, 2010 (JP) .................... 2010-060433

(51) Int. Cl.
*H02H 3/20* (2006.01)

(52) U.S. Cl.
USPC .......... 361/91.2; 361/13; 361/18; 361/23; 361/90; 320/112; 320/134; 320/148; 320/152; 320/163; 318/3; 318/17; 318/139

(58) Field of Classification Search
USPC .......... 318/139, 400.01, 400.23, 400.26, 430, 318/432, 434, 3, 17; 73/114.08, 114.62; 361/13, 18, 23, 41, 90, 91.2, 160; 320/112, 134, 148, 152, 163, 158, 164
See application file for complete search history.

(56) References Cited

U.S. PATENT DOCUMENTS

| | | | |
|---|---|---|---|
| 6,347,030 B1 | 2/2002 | Matsuura | |
| 8,035,943 B2 * | 10/2011 | Turpin et al. | 361/93.9 |
| 2002/0026287 A1 | 2/2002 | Mizuno et al. | |
| 2010/0001737 A1 * | 1/2010 | Kubo et al. | 324/434 |

FOREIGN PATENT DOCUMENTS

| | | |
|---|---|---|
| DE | 199 41 699 A1 | 8/2001 |
| EP | 1 764 892 A1 | 3/2007 |
| JP | 09-202195 | 8/1997 |
| JP | 10-070843 | 3/1998 |
| JP | 2000-050513 | 2/2000 |
| JP | 2001-320264 | 11/2001 |
| JP | 2002-078183 | 3/2002 |
| JP | 2002-252933 | 9/2002 |
| JP | 2007-203929 | 8/2007 |
| JP | 2007-283974 | 11/2007 |
| WO | WO 2008023221 A1 * | 2/2008 ............ H02H 9/08 |

OTHER PUBLICATIONS

Japanese Office Action for JP Appl. No. 2010-060433, dated May Mar. 29, 2012.
German Office Action in counterpart application No. 102011005716.1 dated Jul. 30, 2012.

* cited by examiner

*Primary Examiner* — Antony M Paul
(74) *Attorney, Agent, or Firm* — Finnegan, Henderson, Farabow, Garrett & Dunner, L.L.P.

(57) ABSTRACT

A controller 43 turns on a semiconductor switch 41 in a normal mode, and turns off the semiconductor switch 41 in a sleep mode. A bypass resistor 5 is connected in parallel to the semiconductor switch 41. A resistance value of the bypass resistor 5 is so large as that in the sleep mode, a dark current is supplied to an electronic device 3 via the bypass resistor 5, and if an electric wire downstream of the bypass resistor is short-circuited, an electric current more than a permissive current is prevented from flowing to the electric wire.

9 Claims, 12 Drawing Sheets

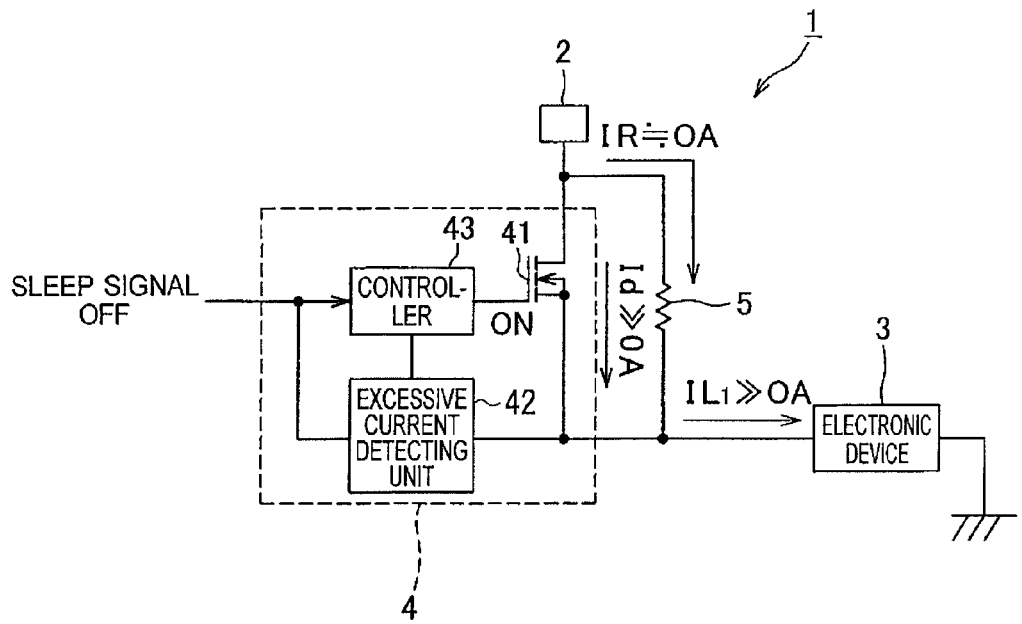
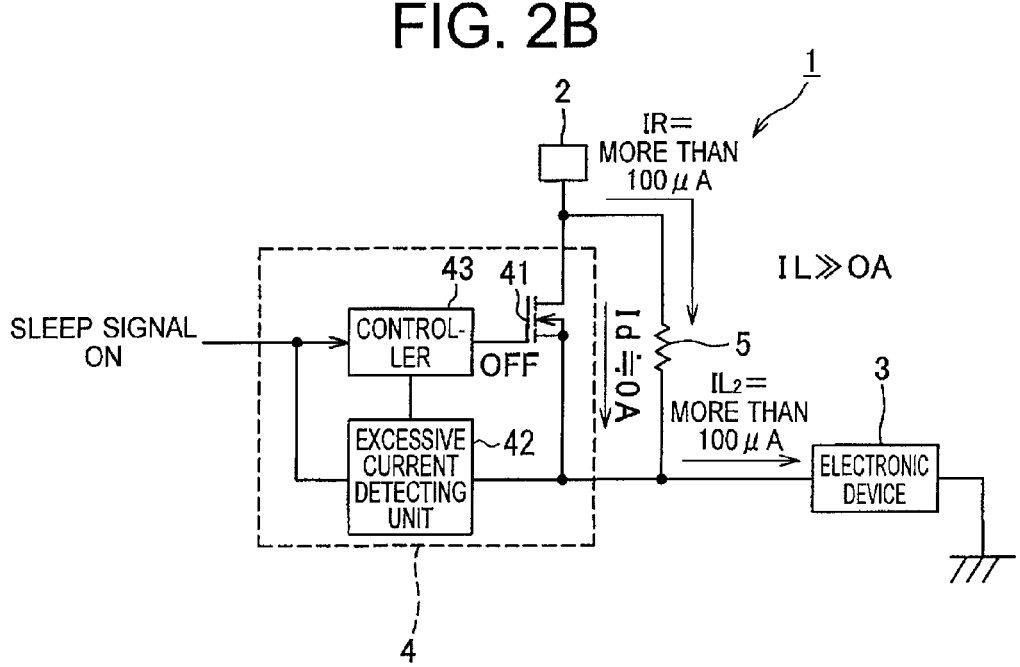

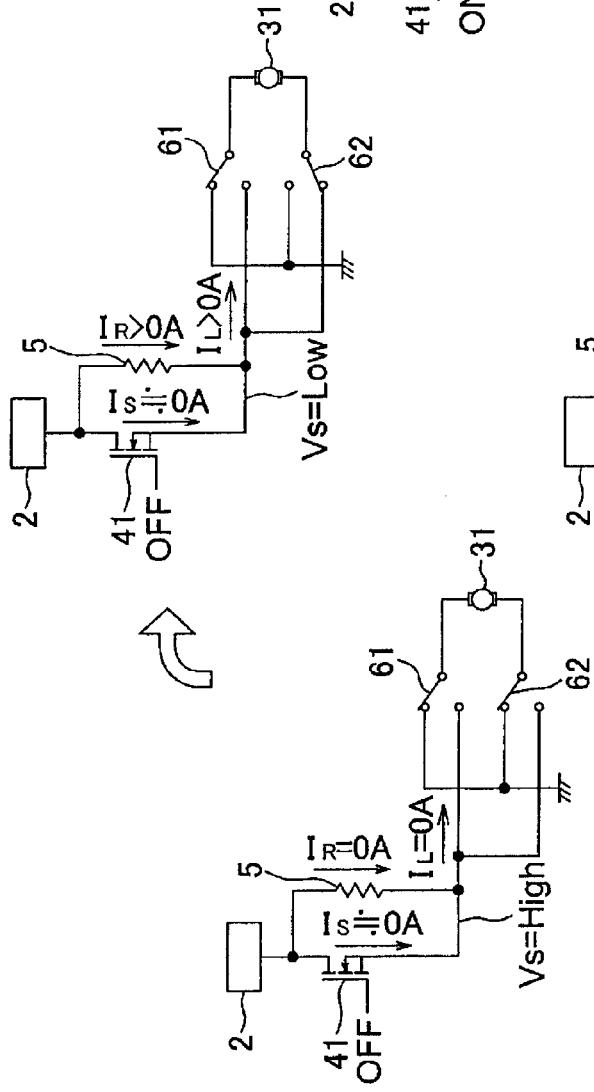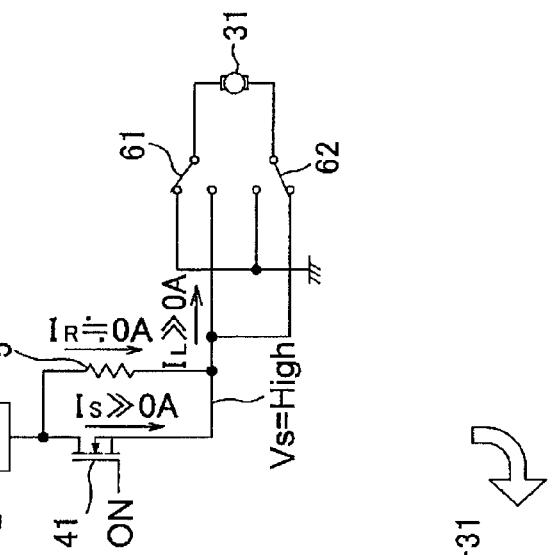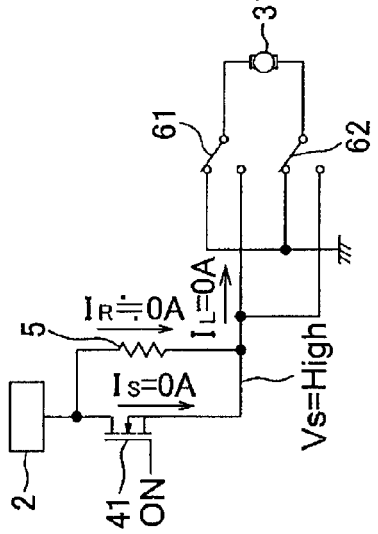

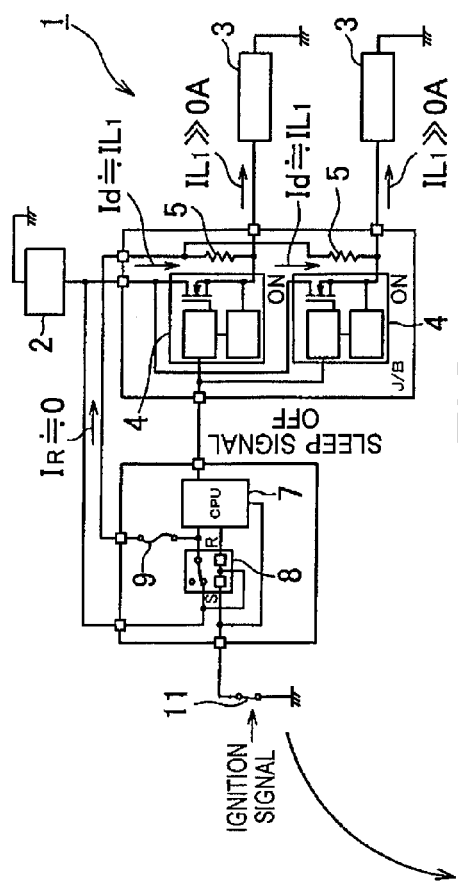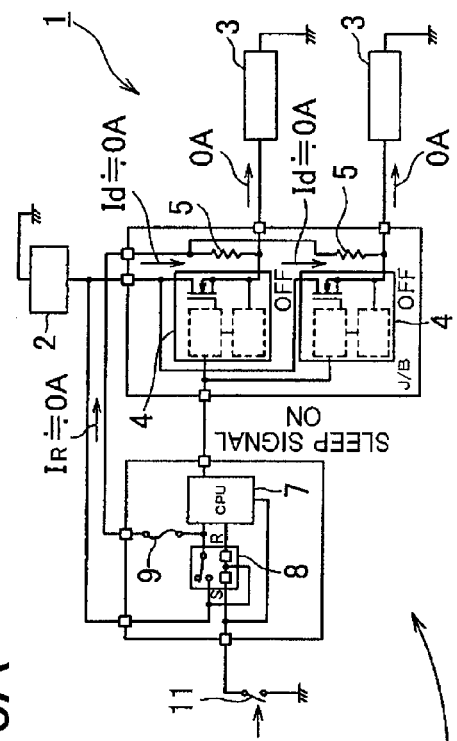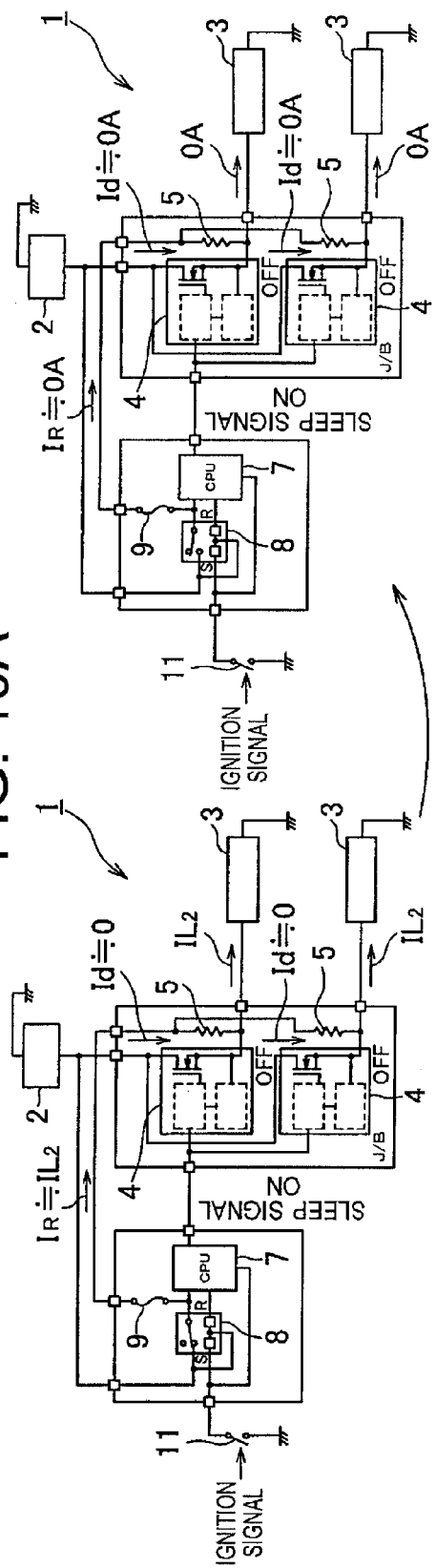

us 8,687,334 B2

POWER FEEDING CIRCUIT

CROSS REFERENCE TO RELATED APPLICATIONS

This application is on the basis of Japanese Patent Application No. 2010-060433, the contents of which are hereby incorporated by reference.

BACKGROUND OF THE INVENTION

1. Field of the Invention

The present invention relates to a power feeding circuit, in particular, a power feeding circuit including: a battery; a load operated by receiving a normal current from the battery in a normal mode, and operated by receiving a dark current smaller than the normal current from the battery in a sleep mode; and a semiconductor switch interposed between the battery and the load.

2. Description of the Related Art

Conventionally, in a vehicle, electricity is supplied to a load via an electric wire from a power source such as a battery or an alternator. Such an electric wire is provided with a protective fuse. When the electric wire is short-circuited and excessive current over permissible current flows, the protective fuse is melted to stop the power supply and protects the electric wire before the electric wire is melted.

However, there is a problem that such a protective fuse is large, and space-consuming, and has high heating value. Therefore, it is thought to provide a semiconductor fuse composed of a semiconductor switch provided on an electric wire, and a controller for switching the semiconductor switch, for example, switching off the semiconductor switch when an excessive current is detected by such as a current sensor.

Incidentally, it is necessary to constantly supply electric power to an electronic device (for example, ECU) as a load mounted on a vehicle even in a sleep mode in which an ignition switch is off and a vehicle is stopped for maintaining clock function, holding memory or the like. Therefore, when the semiconductor fuse is installed, it is necessary to maintain the semiconductor switch on even in the sleep mode. Therefore, it is necessary to get a peripheral circuit such as above-described current sensor and the controller to work normally. Accordingly, power consumption of the peripheral circuit and the controller in the sleep mode cannot be reduced, and there is a fear that the battery may run out.

Further, as an electric power supplying technique to the electronic device in the sleep mode, a dark current measuring circuit for a vehicle shown in FIG. 12 is proposed (Patent Document 1). As shown in FIG. 12, a dark current measuring circuit for a vehicle 100 includes: a battery 101; an ECU 102 as a load operated by receiving power supply from the battery 101; a relay 103 interposed between the battery 101 and the ECU 102; a current measuring circuit 104 connected in parallel to the relay 103; and a control unit 105 connected to the current measuring circuit 104. The current measuring circuit 104 is composed of a current sensor 104a as a current detecting device, and a semiconductor switch 104b connected in series to the current sensor 104a.

In a normal mode, the control unit 105 switches on the relay 103 and switches off the semiconductor switch 104b, thereby an electric current is supplied to the ECU 102 via the relay 103. In a sleep mode, the control unit 105 switches off the relay 103 and switches on the semiconductor switch 104b, thereby the electric current is supplied to the ECU 102 via the current measuring circuit 104. Therefore, in the normal mode, the current sensor 104a does not measure the electric current, and in the sleep mode, the current sensor 104a measures the electric current (dark current). Because a value of the dark current is smaller than the current in the normal mode, a measuring range of the current sensor 104a can be narrower than when the current supplied to the relay 103 is measured.

According to the dark current measuring circuit for a vehicle 100, in the sleep mode, the electric current is supplied to the ECU 102 via the current measuring circuit 104. Therefore, even in the sleep mode, it is necessary to activate the current sensor 104a, and switch on the semiconductor switch 104b. Therefore, even in the sleep mode, there is a first problem that the battery may run out due to the power consumption of the current measuring circuit 104.

Further, it is necessary for a load such as a motor sliding a reclining seat or a slide seat to supply electric power corresponding to operations of a reclining switch or a slide switch even in a sleep mode in which a vehicle is stopped and an ignition switch is off. Therefore, when the semiconductor fuse is provided, it is necessary to maintain the semiconductor switch on even in the sleep mode, and to get the peripheral circuit such as above-described current sensor and the controller to work normally. Accordingly, power consumption of the peripheral circuit and the controller in the sleep mode cannot be reduced, and there is a fear that the battery may run out.

Therefore, it is thought to provide a power feeding circuit 106 as shown in FIG. 13 for saving electric power by switching the semiconductor switch on only when the reclining switch or a slide switch is turned on. As shown in FIG. 13, the power feeding circuit 106 includes: a battery 101 as a power source; a reclining seat motor 102a and a slide motor 102b as a load operated by receiving the power supply from the battery 101; and a group of semiconductor switches 107 respectively provided on both ends of the reclining seat motor 102a and the slide motor 102b.

Each of the group of semiconductor switches 107 is composed of a pair of semiconductor switches 107a connected in series between the battery 101 and a ground. A connecting point between the pair of semiconductor switches 107a is connected to the end of reclining seat motor 102a or the slide motor 102b. Thereby, a direction of the electric current flowing into the reclining seat motor 102a or the slide motor 102b is controlled by the semiconductor switch 107a.

The power feeding circuit 106 further includes: a reclining seat switch 106a operated when the reclining seat is driven; a slide switch 106b operated when the seat is slid; and a controller 108 for switching the semiconductor switch 107a on/off corresponding to the operation of the reclining seat switch 106a or the slide switch 106b.

According to the conventional power feeding circuit 106, four semiconductor switches 107a are needed with regard to the reclining seat motor 102a and the slide motor 102b. Resultingly, it is difficult to downsize or save weight of a relay block or a junction block on which a substrate to be controlled is mounted. Further, two power lines L1, and two signal lines L2 for connecting the controller 108 to the reclining seat switch 106a and the slide switch 106b are needed with regard to the reclining seat motor 102a and the slide motor 102b. Therefore, there is a second problem that a wiring harness in a vehicle becomes enlarged.

Further, as described above, the dark current in the sleep mode is greatly smaller than the current in the normal mode when the ignition is on. However, when a vehicle is stopped for a long time, for example, shipment of cargo, there is a fear that due to even this small dark current, the battery may run out.

Therefore, in order to eliminate the dark current when a vehicle is stopped for a long time for such as shipment of cargo, it is thought to provide a protective device to turn the semiconductor switch composing the semiconductor fuse off to shut off the dark current after a lapse of a specific time after becoming the sleep mode (Patent document 3). However, according to this conventional protective device, it is necessary to maintain the semiconductor switch on and to get the peripheral circuit such as above-described current sensor and the controller to work normally until a specific time lapses after becoming the sleep mode. Therefore, there is a third problem that the power consumption on the peripheral circuit and the controller in the sleep mode cannot be reduced, and there is a fear that the battery may run out.

[Patent document 1] JP, A, 2007-203929
[Patent document 2] JP, A, 2002-78183
[Patent document 3] JP, A, H09-202195

Accordingly, a first object of the present invention is to provide a power feeding circuit configured to reduce the power consumption in the sleep mode. A second object of the present invention is to provide a power feeding circuit configured to reduce the number of semiconductor switches, power lines, and signal lines, and to save power. A third object of the present invention is to provide a power feeding device configured to reduce the power consumption in the sleep mode and to eliminate the dark current when a vehicle is stopped for a long time.

SUMMARY OF THE INVENTION

In order to attain the first object, according to the present invention, there is provided a power feeding circuit including:
 a battery;
 a load operated by receiving a normal current supply from the battery in a normal mode, and operated by receiving a dark current supply smaller than the normal current supply from the battery in a sleep mode; and
 a semiconductor switch interposed between the battery and the load,
 wherein the power feeding circuit further includes:
 a first switch controlling member configured to turn the semiconductor switch on and supply the normal current to the load via the semiconductor switch in the normal mode, and to turn the semiconductor switch off in the sleep mode; and
 a bypass resistor connected in parallel to the semiconductor switch,
 wherein a resistance value of the bypass resister is so large as that the dark current is supplied to the load via the bypass resistor in the sleep mode, and if an electric wire downstream of the bypass resistor is short-circuited, an electric current more than a permissive current is prevented from flowing to the electric wire.

Preferably, the power feeding circuit further includes:
 a current detecting member configured to detect the electric current flowing to the semiconductor switch, and
 wherein the current detecting member stops detecting the electric current in the sleep mode.

In order to attain the second object, according to the present invention, there is provided the power feeding circuit further including:
 a first switching member interposed between the battery and the load and configured to be turned on and off; and
 an on/off state judging member configured to judge the on/off state of the first switching member based on a downstream voltage of the semiconductor switch indicating the on/off state of the first switching member while the semiconductor switch is turned off,
 wherein while the first switch controlling member turns the semiconductor switch off, when the on/off judging member judges that the first switching member is turned on, the first switch controlling member turns the semiconductor switch on.

Preferably, the load is a motor, and the first switching members are respectively disposed on both ends of the motor to switch respectively connections at the both ends of the motor between the battery and a ground.

Preferably, the power feeding circuit further includes:
 a current detecting member configured to detect the electric current flowing to the semiconductor switch,
 wherein the on/off state judging member judges the on/off state of the first switching member based on the electric current detected by the current detecting member while the semiconductor switch is turned on, and
 wherein while the first switch controlling member turns the semiconductor switch on, when the on/off judging member judges that the first switching member is turned off, the first switch controlling member turns the semiconductor switch off.

Preferably, the power feeding circuit further includes:
 a current detecting member configured to detect the electric current flowing to the semiconductor switch,
 wherein while the first switch controlling member turns the semiconductor switch on, the first switch controlling member turns the semiconductor switch off when a first specific time lapses after the current detecting member detects more than a specific current.

Preferably, the first switch controlling member turns the semiconductor switch off when the current detecting member constantly detects more than the specific current for more than a second specific time shorter than the first specific time.

In order to attain the third object, according to the present invention, there is provided the power feeding circuit further including:
 a second switching member connected in series to the bypass resistor and connected in parallel to the semiconductor switch; and
 a second switch controlling member configured to turn the second switching member off when the sleep mode is continued for more than a third specific time.

Preferably, a plurality of the loads are provided, a plurality of the semiconductor switches are provided corresponding to each load, a plurality of the bypass resistors are provided corresponding to each semiconductor switch, and one second switching member is provided corresponding to the plurality of bypass resistors to turn on/off the current flowing to all the bypass resistors in a lump.

Preferably, the second switching member is composed of a latching relay which is turned on when the electric current flows to a set coil, and the set coil is connected in between the battery and the ground and in series to a release switch which is turned on corresponding to a release operation.

These and other objects, features, and advantages of the present invention will become more apparent upon reading of the following detailed description along with the accompanied drawings.

BRIEF DESCRIPTION OF THE DRAWINGS

FIG. 2A is a circuit diagram showing an electric current flow in a normal mode;

FIG. 2B is a circuit diagram showing the electric current flow in a sleep mode;

FIGS. 5A to 5D are an explanatory view showing an operation of the power feeding circuit shown in FIG. 3 in the sleep mode according to the second embodiment of the present invention;

FIG. 10A is a circuit diagram for explaining an operation of the power feeding circuit in the normal mode;

FIG. 10B is a circuit diagram for explaining an operation of the power feeding circuit in the sleep mode;

FIG. 10C is a circuit diagram for explaining an operation of the power feeding circuit in a long time storage mode;

DETAILED DESCRIPTION OF THE PREFERRED EMBODIMENTS

First Embodiment

Figure 1:
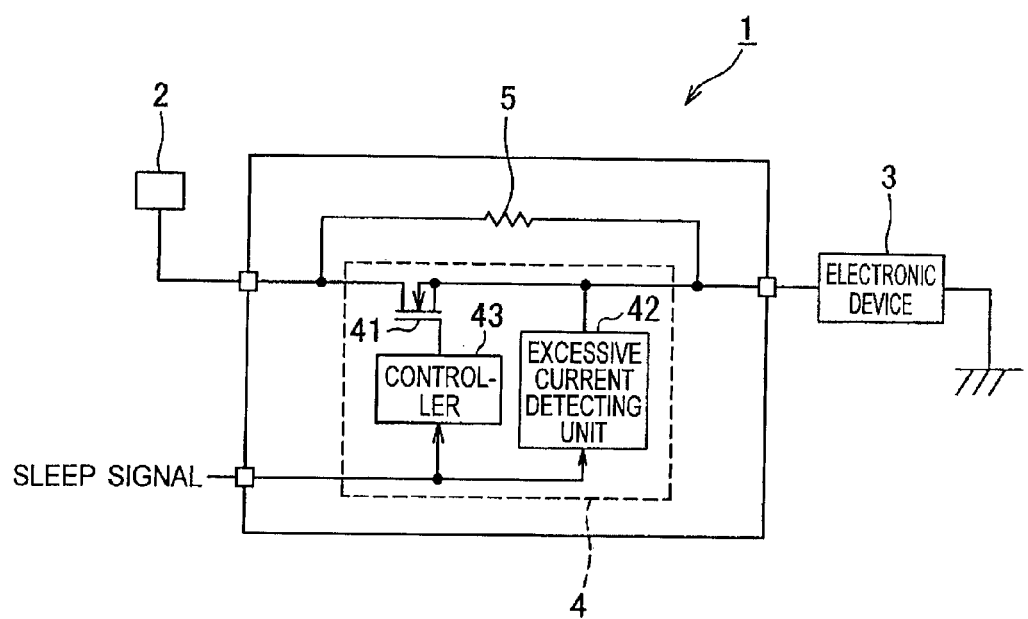
FIG. 1 is a circuit diagram showing a power feeding circuit according to a first embodiment of the present invention.

Hereinafter, a power feeding circuit according to a first embodiment of the present invention will be explained with reference to figures. As shown in FIG. 1, a power feeding circuit 1 includes: a battery 2 as a power source; an electronic device 3 as a load operated by receiving power supply from the battery 2; a semiconductor fuse 4 interposed between the battery 2 and the electronic device 3; and a bypass resistor 5. The battery 2 is, for example, a 12V battery mounted on a vehicle. The electronic device 3 is a load such as ECU operated by receiving a normal current $IL_1$ (see FIG. 2) from the battery 2 in a normal mode, and operated by receiving a dark current $IL_2$ (see FIG. 2) smaller than the normal current $IL_1$ from the battery 2 in a sleep mode.

The semiconductor fuse 4 includes: a semiconductor switch 41 interposed between the battery 2 and the electronic device 3; an excessive current detecting unit 42 as a current detecting member for detecting an excessive current flowing to the semiconductor switch 41; and a controller 43 as a first switch controlling member for turning on/off the semiconductor switch 41.

For example, a field-effect transistor is used as the semiconductor switch 41. As the current sensor used in the excessive current detecting unit 42, for example, the sensor may detects a voltage across a shunt resistance connected in series to the semiconductor switch 41, or if the semiconductor switch 41 has a current detecting function, the function may be used. The controller 43 turns on the semiconductor switch 41 in the sleep mode in which a sleep signal is stopped. In the normal mode, when the excessive current is detected by the excessive current detecting unit 42, the controller 43 turns off the semiconductor switch 41 to prevent the excessive current. Further, the controller 43 turns off the semiconductor switch 41 in the sleep mode in which the sleep signal is outputted.

The bypass resistor 5 is connected in parallel to the semiconductor switch 41. Further, a resistance value of the bypass resistor 5 is so large as to supply the dark current $IL_2$ to the electronic device 3 via the bypass resistor 5 in the sleep mode, and to prevent more than permissive current from flowing to the electric wire even if the electric wire downstream of the bypass resistor 5 is short-circuited.

An operation of the power feeding circuit 1 having above-described structure will be explained with reference to FIGS. 2A and 2B. For example, when an ignition of a vehicle is turned on to stop the sleep signal, the operation becomes in the normal mode, and the controller 43 turns on the semiconductor switch 41. Because the bypass resistance is much greater than on resistance of the semiconductor switch 41, when the semiconductor switch 41 is turned on, as shown in FIG. 2A, the electric current IR flowing to the bypass resistor 5 becomes nearly zero, and the normal current IL1 (which is nearly equal to Id) is supplied to the electronic device 3 via the semiconductor switch 41. Further, when the sleep signal is stopped and the operation is in the normal mode, the excessive current detecting unit 42 starts detecting the excessive current. When the excessive current detecting unit 42 detects the excessive current, the controller 43 turns off the semiconductor switch 41 to shut off the electric current flowing to the electronic device 3.

Further, when the ignition is turned off and the sleep signal is supplied, the operation becomes in the sleep mode, and the controller 43 turns off the semiconductor switch 41. Therefore, as shown in FIG. 2B, the dark current $IL_2$ (nearly equal to IR), for example a few hundred μA, smaller than the normal current $IL_1$ is supplied to the electronic device 3 via the bypass resistor 5. Further, when the sleep signal is supplied, the excessive current detecting unit 42 stops detecting the excessive current.

Because the amount of the electric current needed in the sleep mode is the dark current $IL_2$ (for example, a few hundred μA) much smaller than the normal current $IL_1$, the resistance value of the bypass resistor 5 can be large (for example, a few kΩ). Because the electric current value is restricted by the bypass resistor 5 having the large resistance value, even when the electric wire downstream of the bypass resistor 5 is short-circuited, the excessive current is prevented from flowing to the electric wire.

According to the above-described power feeding circuit 1, when the controller 43 turns off the semiconductor switch 41 in the sleep mode, the dark current $IL_2$ is supplied to the electronic device 3 via the bypass resistor 5. Therefore, in the sleep mode, it is unnecessary to drive the semiconductor switch 41, and the power consumption can be reduced. Further, because the resistance value of the bypass resistor 5 is so large as to prevent more than the permissive current from flowing to the electric wire even when the electric wire downstream of the bypass resistor 5 is short-circuited, the excessive current more than the permissive current is prevented from flowing to the electric wire. Therefore, in the sleep mode, because it is unnecessary to drive the excessive current detecting unit 42 or a switch, the power consumption can be reduced, and the battery is prevented from running out.

Further, according to the above-described power feeding circuit 1, the excessive current detecting unit 42 for detecting the electric current flowing to the semiconductor switch 41 stops detecting the electric current in the sleep mode. Therefore, in the sleep mode, because it is unnecessary to drive the excessive current detecting unit 42, the power consumption can be further reduced, and the battery is prevented from running out.

Second Embodiment

Figure 3:
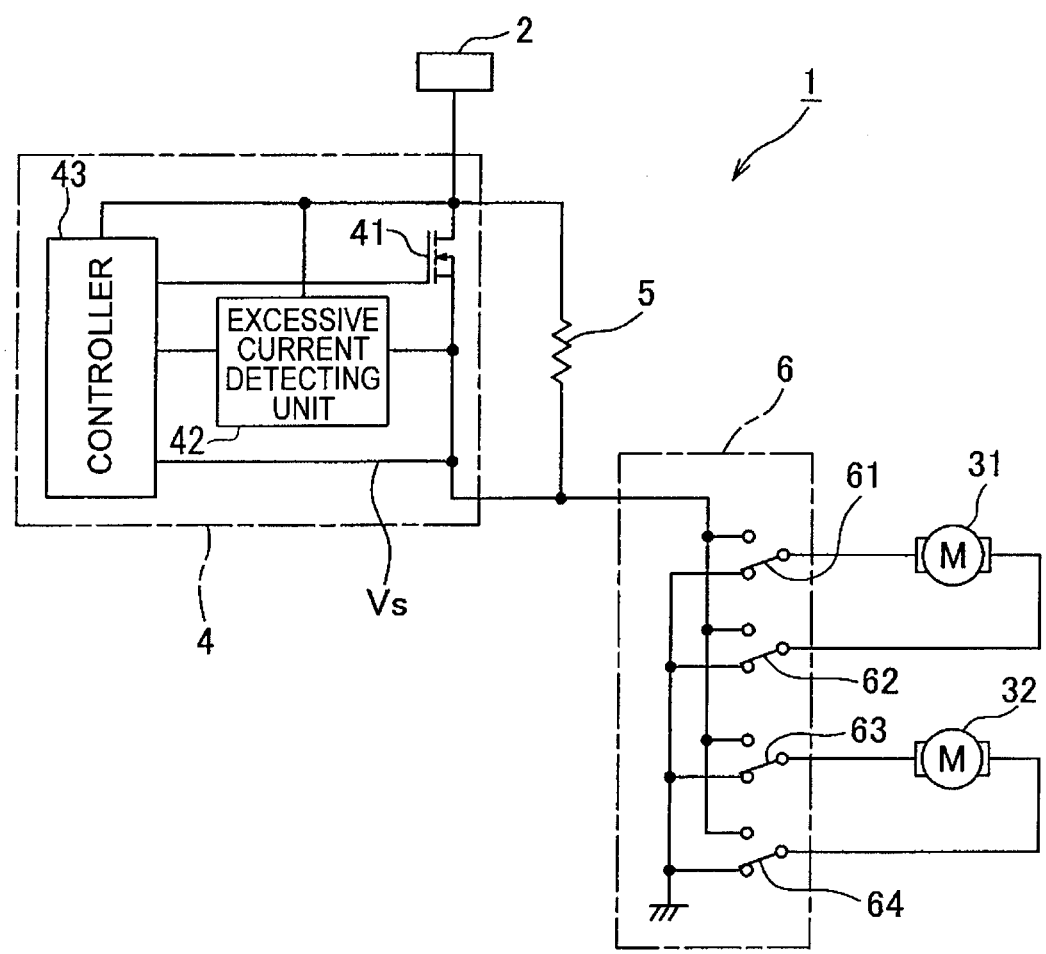
FIG. 3 is a circuit diagram showing one example of the power feeding circuit according to second and third embodiments of the present invention.

Next, the power feeding circuit 1 according to a second embodiment of the present invention will be explained with reference to figures. As shown in FIG. 3, the power feeding circuit 1 includes: a battery 2 as a power source; a reclining seat motor 31 and a slide motor 32 as a load operated by receiving power supply from the battery 2; a switch box 6 interposed between the battery 2 and the motors 31, 32; a semiconductor fuse 4 disposed at a upstream of the switch box 6; and a bypass resistor 5. The battery 2 is, for example, a 12V battery mounted on a vehicle. The reclining seat motor 31 moves a reclining seat of a vehicle, and owing to a flow direction of the electric current, the reclining seat is reclined or raised. The slide motor 32 moves a slide seat of a vehicle back and forth, and owing to a flow direction of the electric current, the slide seat is moved forward or backward.

The switch box 6 includes: switches 61 to 64 as first switching members disposed on both ends of motors 31, 32. The switches 61, 62 switch connections of both ends of the reclining seat motor 31 between the battery 2 and the ground by a user's operation. Further, the switches 63, 64 switch connections of both ends of the slide motor 32 between the battery 2 and the ground by a user's operation.

The semiconductor fuse 4 includes: a semiconductor switch 41 interposed between the battery 2 and the motors 31, 32; a peripheral circuit such as an excessive current detecting unit 42 as a current detecting member for detecting electric current flowing to the semiconductor switch 41; and a controller 43 as a first switch controlling member for turning on/off the semiconductor switch 41. A downstream of the semiconductor switch 41 is connected to the controller 43, and a voltage Vs at the downstream of the semiconductor switch 41 is supplied to the controller 43. This downstream voltage Vs indicates the on/off state of the switches 61 to 64 when the semiconductor switch 41 is turned off.

For example, a field-effect transistor is used as the semiconductor switch 41. As the current sensor used in the excessive current detecting unit 42, for example, the sensor may detects a voltage across a shunt resistance connected in series to the semiconductor switch 41, or if the semiconductor switch 41 has a current detecting function, the function may be used. When the excessive current is detected by the excessive current detecting unit 42, the controller 43 turns off the semiconductor switch 41 to prevent the excessive current. The bypass resistor 5 is connected in parallel to the semiconductor switch 41. Under this condition that the bypass resistor 5 is connected in parallel to the semiconductor switch 41, when the semiconductor switch 41 is turned off, the downstream voltage Vs is changed corresponding to the on/off state of the switches 61 to 64 to indicate the on/off state of the switches 61 to 64.

Figure 4:
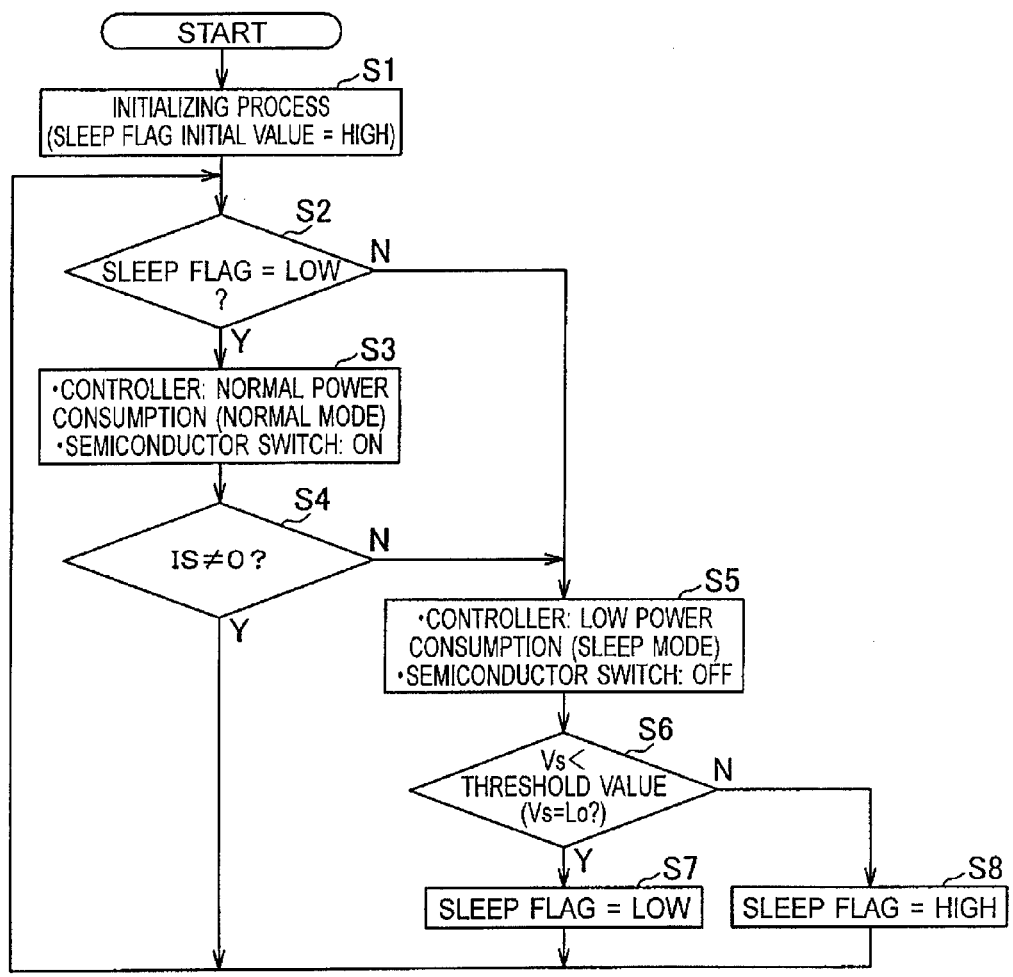
FIG. 4 is a flowchart showing a procedure in a controller composing the power feeding circuit shown in FIG. 3 according to the second embodiment of the present invention.

An operation of the power feeding circuit 1 having the above-described structure will be explained with reference to FIGS. 4 and 5. FIG. 4 is a flowchart for explaining an operation of the controller 43 composing the power feeding circuit 1. FIG. 5 is an explanatory view for explaining an operation of the power feeding circuit 1. Incidentally, in FIG. 5, the slide motor 32, the excessive current detecting unit 42, and the controller 43 are omitted. Firstly, in a first step S1, the controller 43 performs an initializing process. At this time, a sleep flag is set high. Next, the controller 43 judges whether the sleep flag is Low or not (step S2). When the process moves from step S1 to step S2, the controller 43 judges that the sleep flag is high ("N" in step S2), and then the peripheral circuit and the controller 43 are set in the sleep mode, and the semiconductor switch 41 is turned off (step S5).

In this sleep mode, the controller 43 and the peripheral circuit work with lower power consumption than the normal power consumption in the normal mode. Next, the controller 43 works as an on/off state judging device, and judges whether the downstream voltage Vs is lower than a threshold value or not (step S6).

Now, as shown in FIG. 5A, when the downstream switches 61, 62 are connected to the ground (off) and the semiconductor switch 41 is turned off, the electric current Is flowing to the semiconductor switch 41 is nearly zero, and the electric current IR flowing to the bypass resistor 5 is zero. Further, the downstream voltage Vs is nearly equal to the battery voltage (High).

Next, as shown in FIG. 5B, while the semiconductor switch 41 is off, when a user turns the switches 61, 62 to connect the switch 61 to the ground and connect the switch 62 to the battery 2 (on), the electric current is supplied to the reclining seat motor 31 via the bypass resistor 5 from the battery 2. At this time, the electric current flowing from switch 62 to switch 61 is supplied to the reclining seat motor 31.

Because the resistance value of the bypass resistor 5 is very large and the electric current $I_L$ supplied to the reclining seat motor 31 is very small, the reclining seat motor 31 is not moved. As described above, because the bypass resistor 5 is energized, the downstream voltage Vs is reduced to low level. According to the above, under a condition that the semiconductor switch 41 is off, when the downstream voltage Vs is high, the switches 61, 62 are off, and when the downstream voltage Vs is low, the switches 61, 62 are on.

Then, as shown in FIG. 4, when the controller 43 judges that the downstream voltage Vs is more than a threshold value (High) ("N" in step S6), the controller 43 judges that the switches 61, 62 are off, and sets the sleep flag high (step S8), and then the process goes back to step S2. While the switches 61, 62 are off, the steps S2, S5, S6, and S8 are repeated, the sleep mode is maintained, and the off state of the semiconductor switch 41 is maintained.

On the other hand, when the controller 43 judges that the downstream voltage Vs is less than the threshold value (Low) ("Y" in step S6), the controller 43 judges that the switches 61, 62 are on, sets the sleep flag low (step S7), and the process goes back to step S2. When the process is moved from step S7 to step S2, the controller 43 judges that the sleep flag is low ("Y" in step S2), the peripheral circuit and the controller 43 are turned in the normal mode, and the semiconductor switch 41 is turned on (step S3). Therefore, as shown in FIG. 5C, a driving current is supplied to the reclining seat motor 31 via the semiconductor switch 41 from the battery 2, and the reclining seat motor 31 is moved.

Then, as shown in FIG. 4, the controller 43 judges whether an electric current Is detected by the excessive current detecting unit 42 is zero or not (step S4). As shown in FIG. 5D, while the semiconductor switch 41 is on, when a user turns the switches 61, 62 to connect the switches 61, 62 to the ground (off), the driving current supplied to the reclining seat motor 31 from the battery 2 is shut off, and the electric current Is becomes nearly zero. As shown in FIG. 4, when the electric current Is detected by the excessive current detecting unit 42 is zero ("N in step S4), the process goes to step S5, the mode is turned to the sleep mode, and the semiconductor switch 41 is turned off. On the other hand, when the electric current Is detected by the excessive current detecting unit 42 is not zero ("Y" in step S4), the process goes back to step S2. While the switches 61, 62 are on, the steps S2, S3, and S4 are repeated, the normal mode is maintained, and the on state of the semiconductor switch 41 is maintained.

According to the power feeding circuit 1 described above, the switches 61 to 64 are interposed between the battery 2 and the motors 31, 32, and the bypass resistor 5 is connected in parallel to the semiconductor switch 41. Thus, because the bypass resistor 5 is connected in parallel to the semiconductor switch 41, when the semiconductor switch 41 is off, the downstream voltage Vs is varied corresponding to the on/off state of the switches 61 to 64 to indicate the on/off state of the switches 61 to 64. Then, while the semiconductor switch 41 is off, the controller 43 judges the on/off state of the switches 61 to 64 based on the downstream voltage Vs. When the semiconductor switch 41 is off and the controller 43 judges the on state of the switches 61 to 64, the semiconductor switch 41 is turned on. Accordingly, because the controller 43 judges the on/off state of the switches 61 to 64 based on the downstream voltage Vs, signal lines connecting the controller 43 with the switches 61 to 64 in the switch box 6 are unnecessary, and the number of signal lines can be reduced. Further, because the semiconductor switch 41 is off when the switches 61 to 64 are off, it is unnecessary to operate the peripheral circuit and the controller 43 normally, the mode can turn to the sleep mode, and the power consumption can be reduced.

Figure 13:
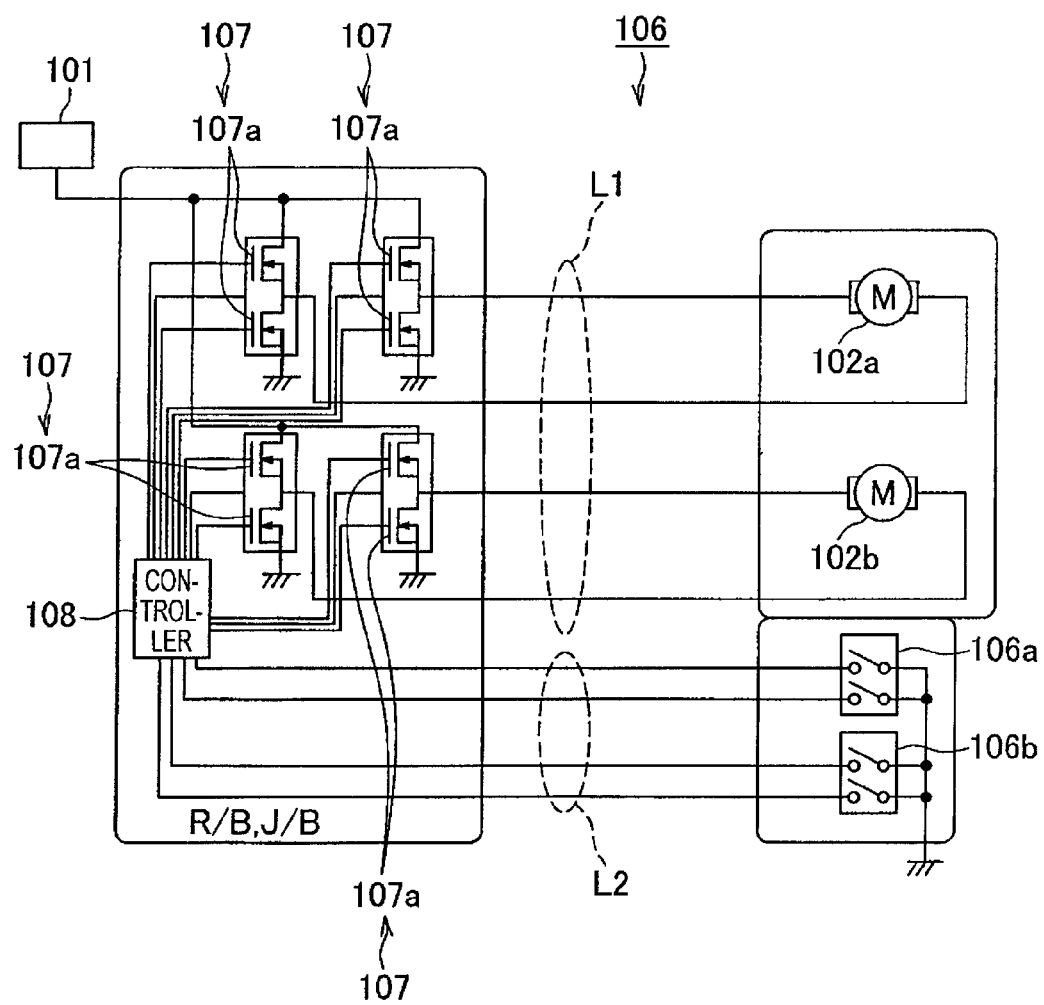
FIG. 13 is a circuit diagram showing an example of a conventional power feeding circuit.

Further, according to the power feeding circuit 1 described above, the switches 61 to 64 are respectively disposed at both ends of the motors 31, 32, and the connections of both ends of the motors 31, 32 are switchable between the battery 2 and the ground. Therefore, these switches 61 to 64 can switch the direction of the electric current flowing to the motors 31, 32. Therefore, it is unnecessary for the semiconductor switch 41 to switch the direction of the electric current flowing to the motors 31, 32. Therefore, compared to the conventional embodiment shown in FIG. 13 in which the semiconductor switches 107a switch the direction of the electric current flowing to the motors 102a, 102b, the number of semiconductor switches 41 is reduced from four to one, and the number of power lines L1 is reduced from four to one.

Further, according to the power feeding circuit 1 described above, while the semiconductor switch 41 is on, the controller 43 judges the on/off state of the switches 61 to 64 based on the electric current detected by the excessive current detecting unit 42. When the semiconductor switch 41 is on and the controller 43 judges the off state of the switches 61 to 64, the semiconductor switch 41 is turned off. Accordingly, because the semiconductor switch 41 is off when the switches 61 to 64 are off, it is unnecessary to operate the peripheral circuit and the controller 43 normally, the mode can turn to the sleep mode, and the power consumption can be reduced.

Incidentally, in the second embodiment described above, when the electric current Is flowing to the semiconductor switch 41 becomes zero, the switches 61 to 64 are judged off. However, the present invention is not limited to this. For example, the switches 61 to 64 may be judged off when the electric current Is flowing to the semiconductor switch 41 becomes less than a specific value.

Third Embodiment

Hereinafter the power feeding circuit 1 according to a third embodiment of the present invention will be explained. Because the structure of the power feeding circuit 1 is the same both in the second embodiment and in the third embodiment, a detailed explanation of the structure of the power feeding circuit 1 is omitted. A different point between the second and third embodiments is below. In the second embodiment, when the electric current Is flowing to the semiconductor switch 41 becomes zero, the controller 43 judges that the switches 61 to 64 are off, and turns off the semiconductor switch 41.

However, according to the above-described method, when the driving current $I_L$ supplied to the motors 31, 32 are not very large, a difference of the electric current Is flowing to the semiconductor switch 41 between the on state and the off state of the switches 61 to 64 is small, and there is a fear that a false judgement may occur such that even when the switches 61 to 64 are not off, the switches 61 to 64 are judged off.

Incidentally, for example, an operating range of the reclining seat motor 31 and the slide motor 32 is limited. Namely, the on state of the reclining seat motor 31 or the slide motor 32 is not continued over an operating time needed for moving the reclining seat or the slide seat from one end to the other end. Therefore, after confirming that a rush current more than a specific current flows to the on-state semiconductor switch 41, for example, when a first specific time more than the operating time lapses, the semiconductor switch 41 may be turned off.

Figure 6:
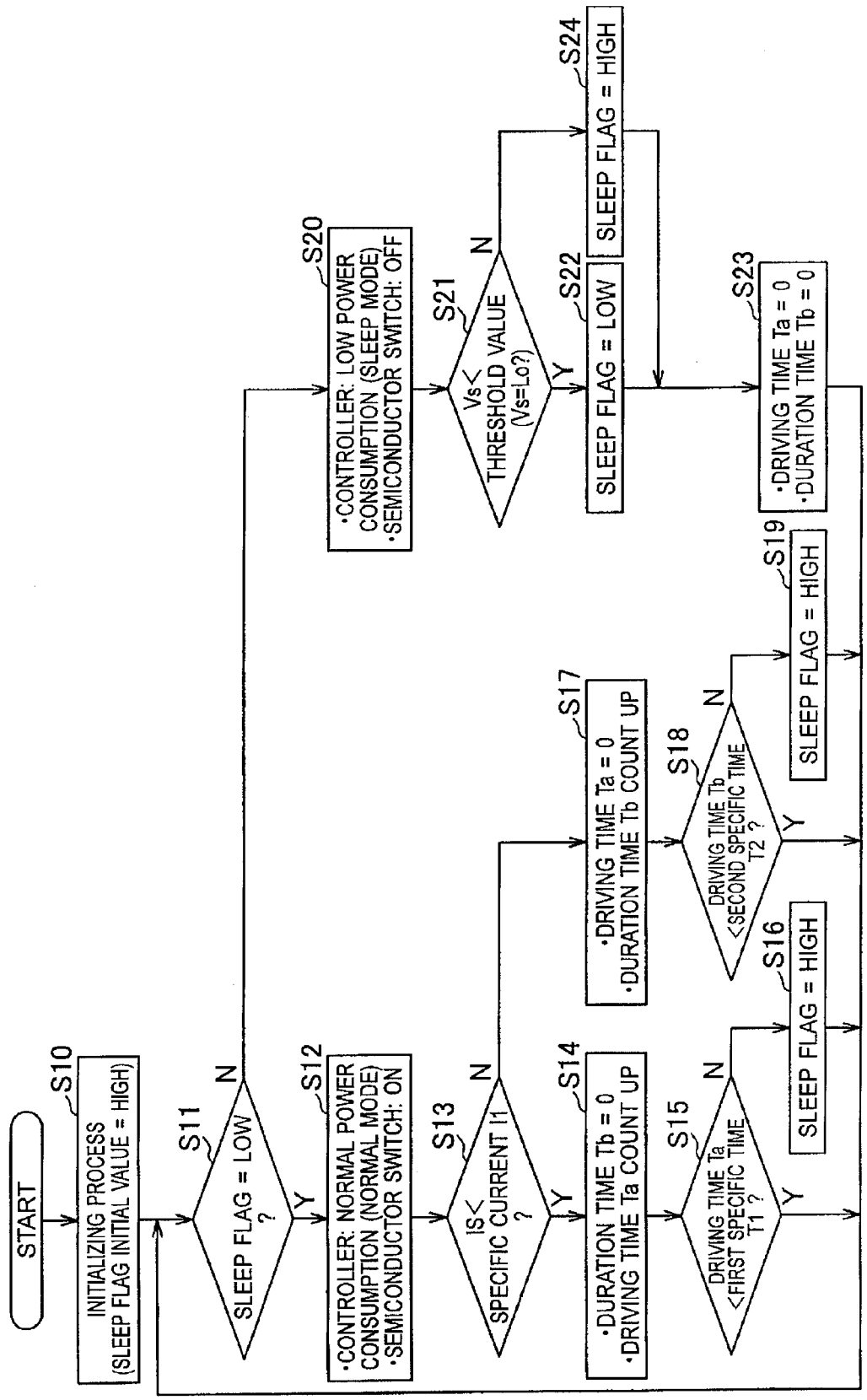
FIG. 6 is a flowchart showing a procedure in the controller composing the power feeding circuit shown in FIG. 3 according to the third embodiment of the present invention.
Figure 7A:
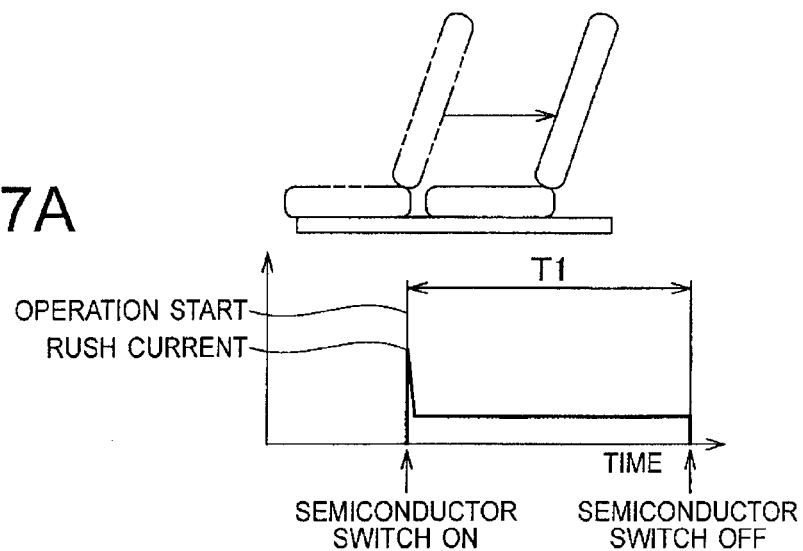
FIGS. 7A to 7C are an explanatory view showing an operation of the power feeding circuit shown in FIG. 3 in the sleep mode according to the third embodiment of the present invention.

Next, an operation of the power feeding circuit 1 according to the third embodiment of which outline is explained above will be explained with reference to FIGS. 6 and 7. First, as shown in FIG. 6, in the first step S10, the controller 43 performs an initialization process. At this time, a sleep flag is set high. Next, the controller 43 judges whether the sleep flag is low or not (step S11). When the process is moved from step S10 to step S11, the controller 43 judges that the sleep flag is high ("N" in step S11), and then the peripheral circuit and the controller 43 are set in the sleep mode, and the semiconductor switch 41 is turned off (step S20).

Next, the controller 43 judges whether the downstream voltage Vs is lower than a threshold value or not (step S21). When the controller 43 judges that the downstream voltage Vs is more than a threshold value (High) ("N" in step S21), the controller 43 judges that the switches 61, 62 are off, and sets the sleep flag high (step S24), sets later-described driving time Ta and duration time Tb zero (step S23), and then the process goes back to step S11.

On the other hand, when the controller 43 judges that the downstream voltage Vs is less than the threshold value (Low) ("Y" in step S21), the controller 43 judges that the switches 61, 62 are on, sets the sleep flag low (step S22), sets the driving time Ta and the duration time Tb zero (step S23), and the process goes back to step S11. When the process is moved from step S22 to step S11, the controller 43 judges that the sleep flag is low ("Y" in step S11), the peripheral circuit and the controller 43 are turned in the normal mode, and the semiconductor switch 41 is turned on (step S12), and then the process goes to step S13. Therefore, a driving current $I_L$ is supplied to the motors 31, 32 via the semiconductor switch 41 from the battery 2, and the reclining seat motor 31 is moved.

In step 13, when the electric current Is detected by the excessive current detecting unit 42 is less than a specific current I1 ("Y" in step S13), the controller 43 judges that the normal driving current $I_L$ is supplied to the motors 31, 32, and sets zero the duration time Tb, which is for a case that the excessive current more than the specific current I1 flows, and counts up the driving time Ta of the motors 31, 32 (step S14).

As a result of counting up, when the driving time Ta is shorter than the first specific time T1 ("Y" in step S15), the process goes back to step S11. On the other hand, as a result of counting up, when the driving time Ta is longer than the first specific time T1 ("N" in step S15), the controller 43 sets the sleep flag high (step S16), then the process goes back to step S11. When the process is moved from step S16 to step S11, the controller 43 judges that the sleep flag is high ("N" in step S11), the peripheral circuit and the controller 43 are turned in the sleep mode, and the semiconductor switch 41 is turned off (step S20). Incidentally, the first specific time T1 is longer than the operating time needed for moving the reclining seat or the slide seat from one end to the other end.

On the other hand, in step 13, when the electric current Is detected by the excessive current detecting unit 42 is more than a specific current I1 ("N" in step S13), the controller 43 judges that the rush current is flowing to the motors 31, 32 because the semiconductor switch 41 is just turned on, or a lock current is flowing because the reclining seat or the slide seat has reached the end, and sets zero the driving time Ta, and counts up the duration time Tb, which is for a case that the excessive current more than the specific current I1 flows (step S17).

As a result of counting up, when the duration time Tb is shorter than the second specific time T2 ("Y" in step S18), the process goes back to step S11. On the other hand, as a result of counting up, when the duration time Tb is longer than the second specific time T2 ("N" in step S18), the controller 43 sets the sleep flag high (step S19), then the process goes back to step S11. When the process is moved from step S19 to step S11, the controller 43 judges that the sleep flag is high ("N" in step S11), the peripheral circuit and the controller 43 are turned in the sleep mode, and the semiconductor switch 41 is turned off (step S20). Incidentally, the second specific time T2 is shorter than the time needed for melting down the electric wire when the excessive current more than the specific current I1 is continued flowing.

Figure 7B:
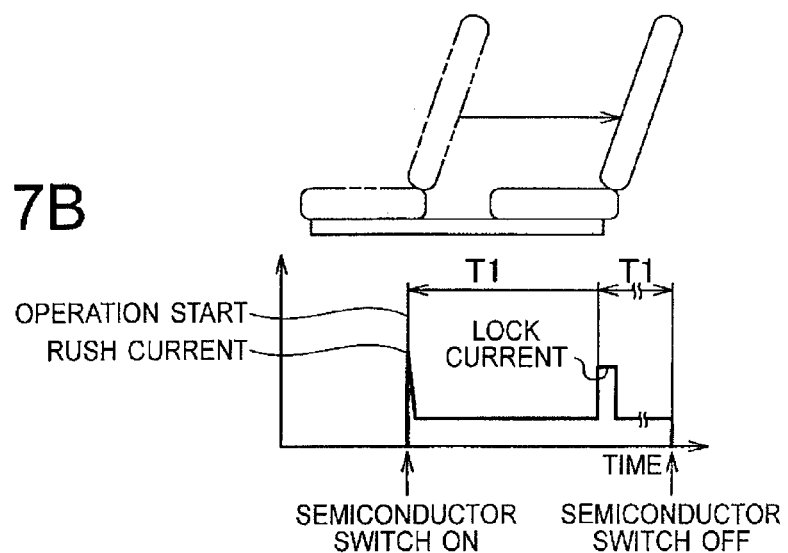

According to the operation explained above, for example, as shown in FIG. 7A, in a case that the switches 63, 64 are turned off before the slide seat reaches the end, when the first specific time T1 lapses after the semiconductor switch 41 is turned on and the rush current more than the first specific current I1 flows, the controller 43 turns off the semiconductor switch 41. Further, as shown in FIG. 7B, in a case that the switches 63, 64 are turned off after the slide seat reaches the end, when the first specific time T1 lapses after the slide seat reaches the end and the lock current more than the first specific current I1 flows, the controller 43 turns off the semiconductor switch 41.

Figure 7C:
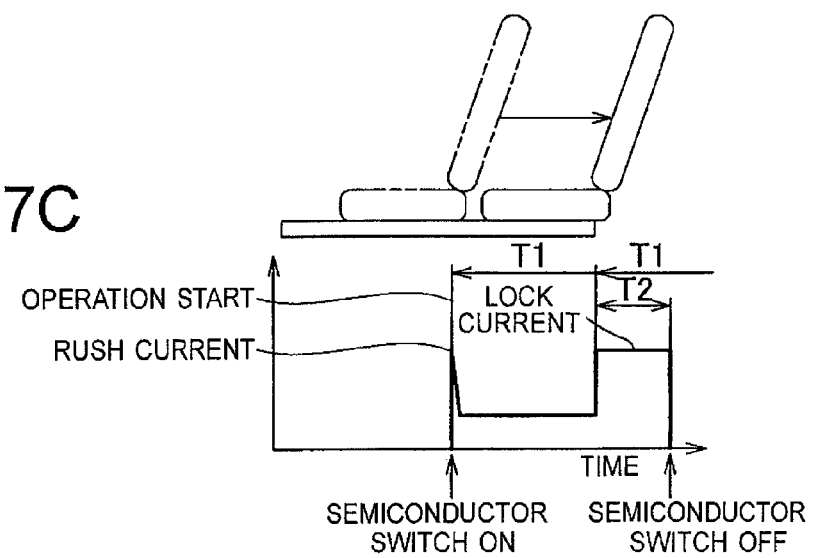

Further, as shown in FIG. 7C, in a case that the switches 63, 64 are maintained on even though the slide seat has reached the end, when the lock current more than the specific current I1 is continued flowing over the second specific time T2, the controller 43 turns off the semiconductor switch 41.

According to the above-described power feeding circuit 1, when the first specific time T1 lapses after the excessive current detecting unit 42 detects the electric current more than the specific current I1, the controller 43 turns off the semiconductor switch 41. Therefore, even if it is difficult to detect the off state of the switches 61 to 64 based on the electric current flowing to the semiconductor switch 41, the semiconductor switch 41 is surely turned off corresponding to the off state of the switches 61 to 64.

According to the above-described power feeding circuit 1, when the excessive current detecting unit 42 is continued detecting the electric current more than the specific current I1 for more than the second specific time T2 shorter than the first specific time T1, the controller 43 turns off the semiconductor switch 41. Therefore, an excessive current can be prevented.

Fourth Embodiment

Figure 8:
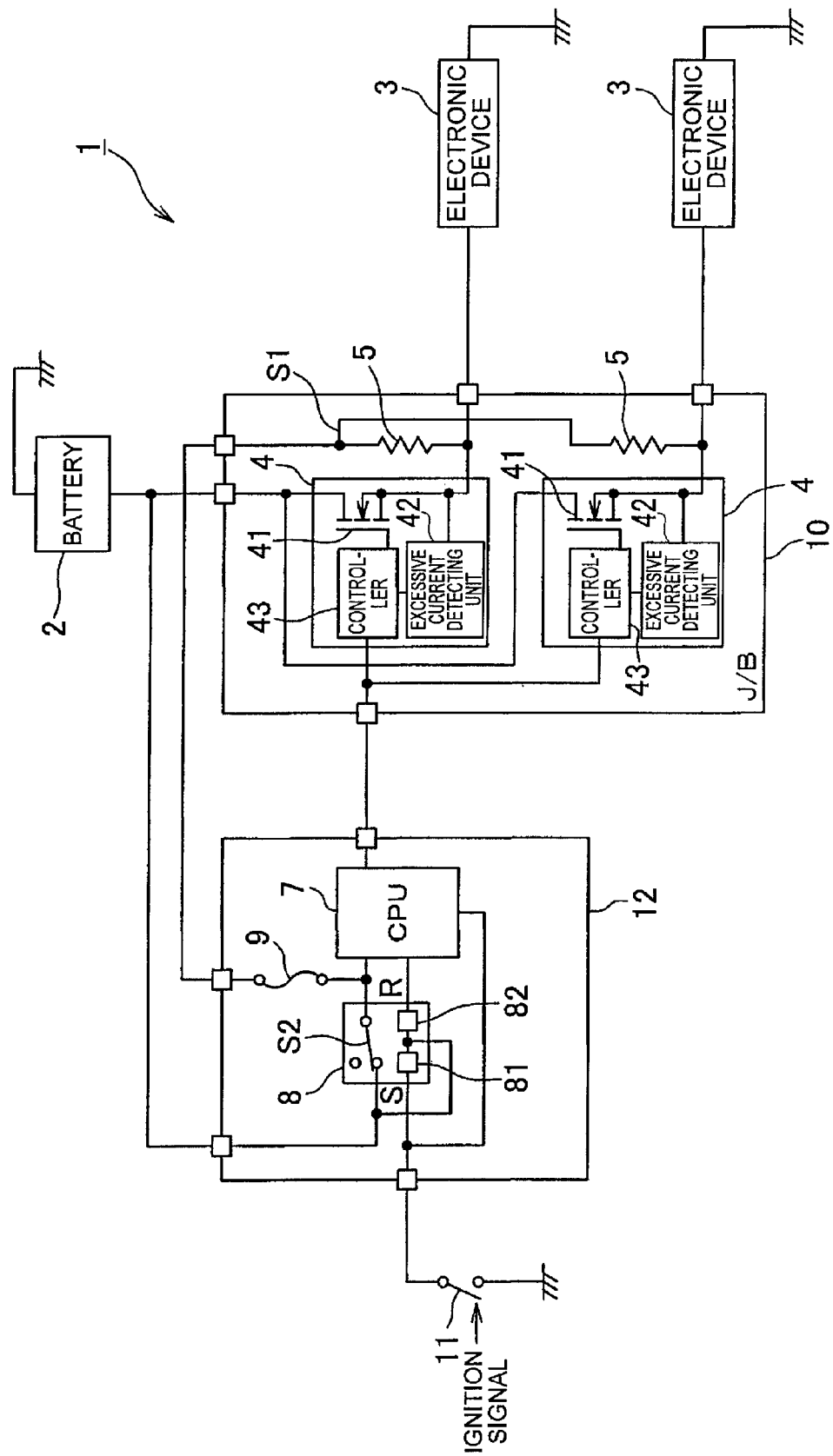
FIG. 8 is a circuit diagram showing the power feeding circuit according to a fourth embodiment of the present invention.

Next, the power feeding circuit 1 according to a fourth embodiment of the present invention will be explained with reference to figures. As shown in FIG. 8, the power feeding circuit 1 includes: a battery 2 as a power source; for example, two electronic devices 3 as a load operated by receiving the power supply from the battery 2; a semiconductor fuse 4 interposed between the battery 2 and the electronic device 3; a bypass resistor 5; a CPU 7; a latching relay 8 as a second switching member; and a protective fuse 9. The battery 2 is, for example, a 12V battery mounted on a vehicle. The two electronic devices 3 are connected in parallel to each other. Further, the electronic device 3 is a load such as ECU operated by receiving a normal current from the battery 2 in a normal mode, and operated by receiving a dark current smaller than the normal current from the battery 2 in a sleep mode.

Two semiconductor fuses 4 are provided corresponding to each electronic device 3. Each of the two semiconductor fuses 4 includes: a semiconductor switch 41 interposed between the battery 2 and the electronic device 3; an excessive current detecting unit 42 as a current detecting member for detecting an excessive current flowing to the semiconductor switch 41; and a controller 43 for turning on/off the semiconductor switch 41.

For example, a field-effect transistor is used as the semiconductor switch 41. As the current sensor used in the excessive current detecting unit 42, for example, the sensor may detects a voltage across a shunt resistance connected in series to the semiconductor switch 41, or if the semiconductor switch 41 has a current detecting function, the function may be used.

Each controller 43 is connected to the later-described CPU 7. When the sleep signal from the CPU 7 is stopped, the controller 43 is turned into the normal mode, and turns on the semiconductor switch 41. In this normal mode, when the excessive current detecting unit 42 detects the excessive current, the controller 43 turns off the semiconductor switch 41 to prevent the excessive current. Further, when the later-described CPU 7 outputs the sleep signal, the controller 43 is turned into the sleep mode, and turns off the semiconductor switch 41. Two bypass resistors 5 are provided corresponding to each semiconductor switch 41, and connected in parallel to the semiconductor switch 41. Further, a resistance value of the bypass resistor 5 is so large as to supply the dark current to the electronic device 3 via the bypass resistor 5 in the sleep mode, and to prevent more than permissive current from flowing to the electric wire even if the electric wire downstream of the bypass resistor 5 is short-circuited. The semiconductor fuse 4 and the bypass resistor 5 are received in a junction box 10.

The CPU 7 is connected to a not-shown ignition switch. When the ignition switch is off, the CPU7 outputs the sleep signal to the semiconductor fuse 4, and when the ignition switch is on, the CPU 7 stops outputting the sleep signal to the semiconductor fuse 4. The latching relay 8 is connected in series to the bypass resistor 5, and connected in parallel to the semiconductor switch 41. Thereby, when a contact S2 of the latching relay 8 is turned on, the bypass resistor 5 is connected to the battery 2, and the electric current flows to the bypass resistor 5. On the other hand, when the contact S2 of the latching relay 8 is turned off, the connection between the bypass resistor 5 and the battery 2 is separated, and the electric current flowing to the bypass resistor 5 is shut off.

Further, the latching relay 8 is provided on the upstream of the contact S1 disposed at the upstream of the two bypass resistors 5. Namely, one latching relay 8 is provided corresponding to the two bypass resistors 5, and turns on/off in a lump the electric current flowing to the two bypass resistors 5. Further, the latching relay 8 is interposed between the battery 2 and the CPU 7. According to the above, when the contact S2 of the latching relay 8 is turned on, the electric power is supplied to the CPU 7 from the battery 2, and when the contact S2 of the latching relay 8 is turned off, the electric power supplied to the CPU 7 from the battery 2 is shut off.

Next, a detailed structure of the latching relay 8 will be explained. The latching relay 8 is provided with the contact S2, a set coil 81, and a reset coil 82. The set coil 81 is connected between the battery 2 and the ground, and in series to a release switch 11. For example, the release switch 11 is turned on when an ignition signal indicating that the ignition switch is on is supplied. According to the above, when the ignition switch is turned on (release operation), the release switch 11 is turned on, and the electric current flows to the set coil 81 to turn on the contact S2. The reset coil 82 is interposed between the battery 2 and the CPU 7. Thereby, when a low level signal is outputted from the CPU 7, the electric current in opposite direction of the electric current flowing to the set coil 81 flows to the reset coil 82 to turn off the contact S2. Further, the protective fuse 9 is interposed between the upstream of the two bypass resistors 5 and the latching relay 8. When the downstream electric wire is short-circuited and the excessive current flows, the protective fuse 9 is melted to protect the electric wire. The above-described CPU7, the latching relay 8, and the protective fuse 9 are received in a power management controller 12.

Figure 9:
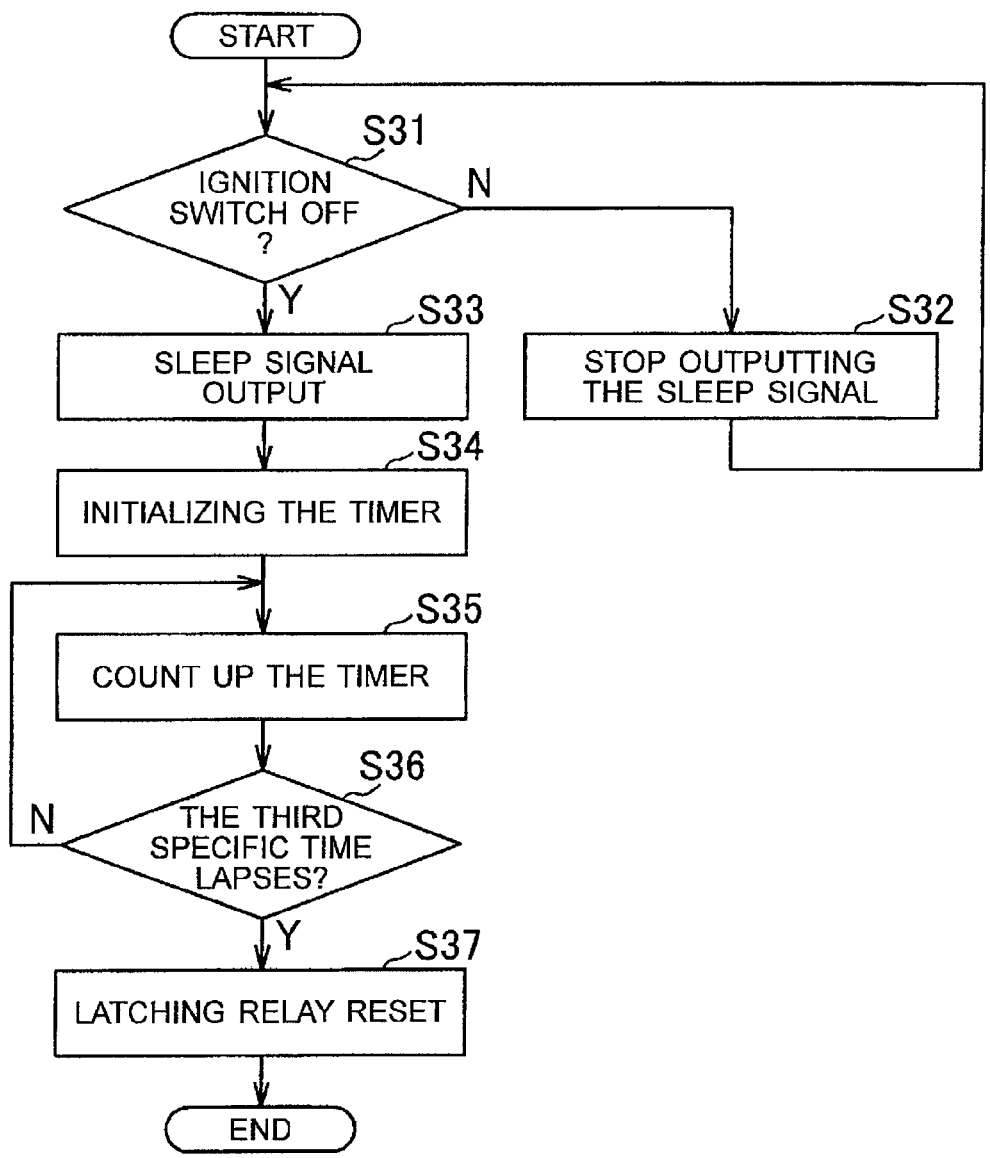
FIG. 9 is a flowchart showing a procedure in a CPU composing the power feeding circuit shown in FIG. 8.

An operation of the power feeding circuit 1 having the above-described structure will be explained with reference to FIGS. 9 and 10. The CPU 7 starts operating corresponding to the power supply. Then, for example, when the ignition switch of a vehicle is turned on ("N" in step S31), the CPU 7 works as a first switch controlling member to stop outputting the sleep signal (step S32). When the sleep signal from the CPU 7 is stopped, the controller 43 of each semiconductor fuse 4 is turned into the normal mode, and turns on the semiconductor switch 41.

Because the bypass resistor 5 is much larger than the on resistance of the semiconductor switch 41, when the semiconductor switch 41 is turned on, as shown in FIG. 10A, the electric current IR flowing to the bypass resistor 5 becomes nearly zero, and the normal current $IL_1$ (=Id flowing to the semiconductor switch 41) is supplied to the electronic device 3 via the semiconductor switch 41. Further, when the sleep signal is stopped and the process turns into the normal mode, the excessive current detecting unit 42 starts detecting the excessive current. When the excessive current is detected by the excessive current detecting unit 42, the controller 43 turns off the semiconductor switch 41 to shut off the electric current flowing to the electronic device 3.

Further, when the ignition switch of a vehicle is turned off ("Y" in step S31), the CPU 7 works as the first switch controlling member and outputs the sleep signal (step S33). When the sleep signal is outputted from the CPU 7, the controller 43 of each semiconductor fuse 4 is turned into the sleep mode, and turns off the semiconductor switch 41. Therefore, as shown in FIG. 10B, the electric current flowing to the semiconductor switch 41 becomes nearly zero, and the dark current $IL_2$ (=IR) smaller than the normal current IL1, for example, about 100 μA, is supplied to the electronic device 3 via the bypass resistor 5. Further, when the sleep signal is outputted, the excessive current detecting unit 42 stops detecting the excessive current.

Because the necessary current of the electronic device 3 in the sleep mode is the dark current $IL_2$ (for example, a few hundred μA) much smaller than the normal current $IL_1$, the resistance value of the bypass resistor 5 can be large (for example, a few kilo Ω). Because the electric current is restricted by the bypass resistor 5 having the large resistance value, if the electric wire downstream of the bypass resistor 5 is short-circuited, the excessive current is prevented from flowing to the electric wire.

Next, the CPU 7 initializes a timer for counting the elapsed time after a transition to the sleep mode (step S34), and count up the timer (step S35). When the elapsed time after the transition to the sleep mode is over the third specific time ("Y" in step S36), the CPU 7 works as a second switch controlling member and outputs the low level signal to the latching relay 8 to energize the reset coil 82 of the latching relay 8 (step S37), and the process goes to the end. Thereby, as shown in FIG. 10C, the latching relay 8 is turned off, the dark current $IL_2$ supplied via the bypass resistor 5 is shut off, the power supply to the CPU 7 is also shut off, and the process turns into a long time storage mode.

Then, after a long storage period for such as shipment of cargo is ended, when a user turns on the ignition switch (release operation), the ignition signal is supplied to the release switch 11 to turn on the release switch 11, and then the electric current is supplied to the set coil 81 of the latching relay 8 to turn on the latching relay 8. Thereby, the power is supplied to the CPU 7 and the CPU 7 starts the process again.

According to the above-described power feeding circuit 1, when the CPU 7 turns off the semiconductor switch 41 in the sleep mode, the dark current $IL_2$ is supplied to the electronic device 3 via the bypass resistor 5. Therefore, in the sleep mode, it is unnecessary to drive the semiconductor switch 41 and the power consumption is reduced. Further, when the sleep mode is continued for more than the third specific time, the CPU 7 turns off the latching relay 8 to shut off the dark current $IL_2$ flowing via the bypass resistor 5. Therefore, when a vehicle is stored for a long time, the dark current is eliminated.

Further, according to the above-described power feeding circuit 1, one latching relay 8 is provided corresponding to two bypass resistors 5, and turns on/off in a lump the electric current flowing to all the bypass resistors 5. Therefore, it is unnecessary to provide a plurality of latching relays 8 corresponding to a plurality of bypass resistors 5, and the cost of the power feeding circuit 1 can be reduced.

Further, according to the above-described power feeding circuit 1, the set coil 81 of the latching relay 8 is connected in between the battery 2 and the ground, and in series to the release switch 11. Therefore, when a release action of the long time storage mode is done (for example, the ignition switch is turned on) and the release switch 11 is turned on, the electric current flows to the set coil 81 to turn on the latching relay 8. Therefore, automatically the latching relay 8 is turned on corresponding to the release action with a simple structure.

Incidentally, according to the fourth embodiment described above, two electronic devices 3 are provided. However, the present invention is not limited to this. The number of the electronic devices 3 may be one, or more than two.

Further, according to the fourth embodiment described above, the relay is used as the second switching member. However, the present invention is not limited to this. For example, a semiconductor relay such as a transistor may be used.

Further, according to the fourth embodiment described above, when the ignition switch is turned on, the ignition signal is outputted and the release switch 11 is turned on. However, the present invention is not limited to this. For example, corresponding to a door lock release operation of a vehicle, other signal such as a security signal may be used to turn on the release switch 11.

Figure 11:
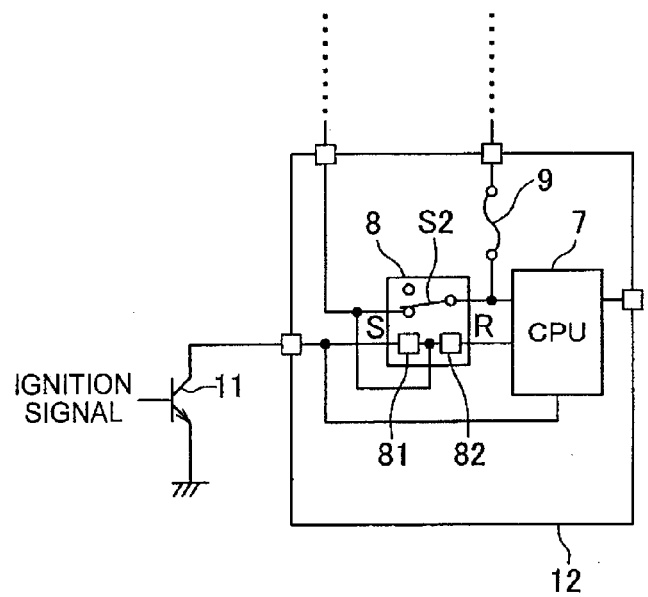
FIG. 11 is a circuit diagram showing an example of a release switch according to another embodiment.
Figure 12:
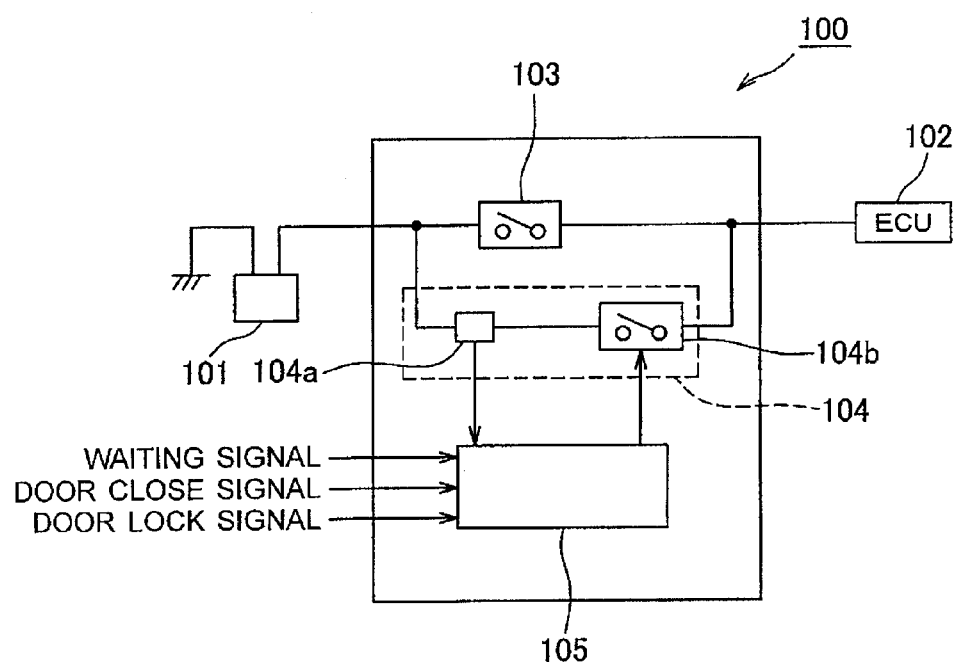
FIG. 12 is a circuit diagram showing an example of a dark current measuring circuit for a vehicle as a conventional power feeding device.

Further, for example, as shown in FIG. 11, the release switch 11 may be composed of a semiconductor switch such as a transistor, and the ignition signal (or security signal) is supplied to a base of the semiconductor switch, thereby corresponding to the ignition signal supply, the release switch 11 may be turned on.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A power feeding circuit comprising:
   a battery;
   a load operated by receiving a normal current supply from the battery in a normal mode, and operated by receiving a dark current supply smaller than the normal current supply from the battery in a sleep mode; and
   a semiconductor switch interposed between the battery and the load,
   wherein the power feeding circuit further comprises:
   a first switch controlling member configured to turn the semiconductor switch on and supply the normal current to the load via the semiconductor switch in the normal mode, and to turn the semiconductor switch off in the sleep mode;
   a bypass resistor connected in parallel to the semiconductor switch,
   a first switching member interposed between the battery and the load and configured to be turned on and off; and
   on/off state judging member configured to judge the on/off state of the first switching member based on a downstream voltage of the semiconductor switch indicating the on/off state of the first switching member while the semiconductor switch is turned off,
   wherein a resistance value of the bypass resister is so large as that the dark current is supplied to the load via the bypass resistor in the sleep mode, and if an electric wire downstream of the bypass resistor is short-circuited, an electric current more than a permissive current is prevented from flowing to the electric wire; and
   wherein while the first switch controlling, member turns the semiconductor switch off, when the on/off judging member judges that the first switching member is turned on, the first switch controlling member turns the semiconductor switch on.

2. The power feeding circuit as claimed in claim 1 further comprising:
   a current detecting member configured to detect the electric current flowing to the semiconductor switch, and
   wherein the current detecting member stops detecting the electric current in the sleep mode.

3. The power feeding circuit as claimed in claim 1,
   wherein the load is a motor, and the first switching members are respectively disposed on both ends of the motor to switch respectively connections at the both ends of the motor between the battery and a ground.

4. The power feeding circuit as claimed in claim 1 further comprising:
   a current detecting member configured to detect the electric current flowing to the semiconductor switch,
   wherein the on/off state judging member judges the on/off state of the first switching member based on the electric current detected by the current detecting member while the semiconductor switch is turned on, and
   wherein while the first switch controlling member turns the semiconductor switch on, when the on/off judging member judges that the first switching member is turned off, the first switch controlling member turns the semiconductor switch off.

5. The power feeding circuit as claimed in claim 1 further comprising:
   a current detecting member configured to detect the electric current o ing to the semiconductor switch,
   wherein while the first switch controlling member turns the semiconductor switch on, the first switch controlling member turns the semiconductor switch off when a first specific time lapses after the current detecting member detects more than a specific current.

6. The power feeding circuit as claimed in claim 5,
   wherein the first switch controlling member turns the semiconductor switch off when the current detecting member constantly detects more than the specific current for more than a second specific time shorter than the first specific time.

7. The power feeding circuit as claimed in claim 1 further comprising:
   a second switching member connected in series to the bypass resistor and connected in parallel to the semiconductor switch; and
   a second switch controlling member configured to turn the second switching member off when the sleep mode is continued for more than a third specific time.

8. The power feeding circuit as claimed in claim 7,
   wherein a plurality of the loads are provided, a plurality of the semiconductor switches are provided corresponding to each load, a plurality of the bypass resistors are provided corresponding to each semiconductor switch, and one second switching member is provided corresponding to the plurality of bypass resistors to turn on/off the current flowing to all the bypass resistors in a lump.

9. The power feeding circuit as claimed in claim 7,
   wherein the second switching member is composed of a latching relay which is turned on when the electric current flows to a set coil, and the set coil is connected in between the battery and the ground and in series to a release switch which is turned on corresponding to a release operation.

* * * * *

UNITED STATES PATENT AND TRADEMARK OFFICE
CERTIFICATE OF CORRECTION

| | | |
|---|---|---|
| PATENT NO. | : 8,687,334 B2 | Page 1 of 1 |
| APPLICATION NO. | : 13/049565 | |
| DATED | : April 1, 2014 | |
| INVENTOR(S) | : Keisuke Ueta et al. | |

It is certified that error appears in the above-identified patent and that said Letters Patent is hereby corrected as shown below:

Title Page (73) Yazaki Corporation, Tokyo (JP)
    should read: Toyota Jidosha Kabushiki Kaisha, Aichi (JP)

Signed and Sealed this
Sixth Day of January, 2015

Michelle K. Lee
*Deputy Director of the United States Patent and Trademark Office*